United States Patent [19]

Small

[11] Patent Number: 5,442,567
[45] Date of Patent: Aug. 15, 1995

[54] APPARATUS AND METHOD FOR ELECTRONICALLY DISPENSING PERSONALIZED GREETING CARDS AND GIFTS

[76] Inventor: Maynard E. Small, 105 Ward Pkwy., Apt. 507, Kansas City, Mo. 64112

[21] Appl. No.: 56,706

[22] Filed: Apr. 30, 1993

[51] Int. Cl.⁶ .............................................. G05B 19/18
[52] U.S. Cl. ................................... 364/479; 364/468; 235/381; 902/30
[58] Field of Search ............... 364/408, 479, 478, 468, 364/410–412; 235/379, 381, 382, 383; 902/18, 30, 21–23, 41; 283/75, 49, 51, 58, 59; 229/71, 68 R, 70; 273/439

[56] References Cited

U.S. PATENT DOCUMENTS

| | | |
|---|---|---|
| 4,414,896 | 11/1983 | Fischer . |
| 4,616,327 | 10/1986 | Rosewarne et al. . |
| 4,625,275 | 11/1986 | Smith . |
| 4,677,565 | 6/1987 | Ogaki et al. . |
| 4,699,532 | 10/1987 | Smith . |
| 4,733,362 | 3/1988 | Haraguchi . |
| 4,789,147 | 12/1988 | Berger et al. . |
| 4,809,837 | 3/1989 | Hayashi . |
| 4,817,043 | 3/1989 | Brown . |
| 4,873,643 | 10/1989 | Powell et al. . |
| 4,896,791 | 1/1990 | Smith . |
| 4,949,257 | 8/1990 | Orbach . |
| 4,970,655 | 11/1990 | Winn . |
| 5,017,953 | 5/1991 | Biondo, Jr. . |
| 5,029,099 | 7/1991 | Goodman . |
| 5,036,293 | 8/1991 | Goodman . |
| 5,036,472 | 7/1991 | Buckley . |
| 5,043,889 | 8/1991 | Lucey ................................. 364/412 |
| 5,056,029 | 10/1991 | Cannon . |
| 5,127,104 | 6/1992 | Dennis . |
| 5,132,915 | 7/1992 | Goodman . |
| 5,133,560 | 7/1992 | Small . |
| 5,143,279 | 9/1992 | Gaines . |
| 5,243,174 | 9/1993 | Veeneman et al. ................. 364/479 |

*Primary Examiner*—James Trammell
*Attorney, Agent, or Firm*—Litman, McMahon and Brown

[57] ABSTRACT

A vending machine which allows a customer to design and personalize a greeting card also allows the customer to integrate an electronically vendable gift along with or directly onto the card. A stand-alone kiosk includes a credit card verifier, an alphanumeric keyboard, a video screen, a color printer printing on blank or partially printed card stock, and a gift calculator and vender, all controlled by a CPU. Examples of gifts available through the machine include chances at telephone games, such as SPELLIT, gift certificates, long distance toll free return telephone calls, lottery tickets, and, where sports gaming is legal, bets on the gift recipient's favorite sports team. Any or all of these gifts can be printed directly onto the personalized card.

3 Claims, 1 Drawing Sheet

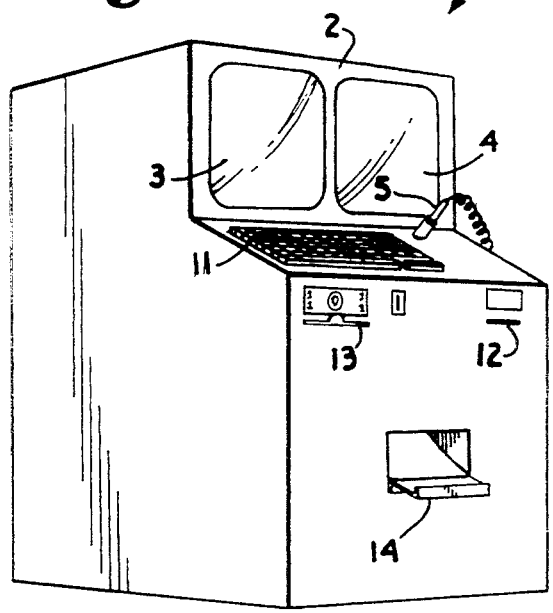
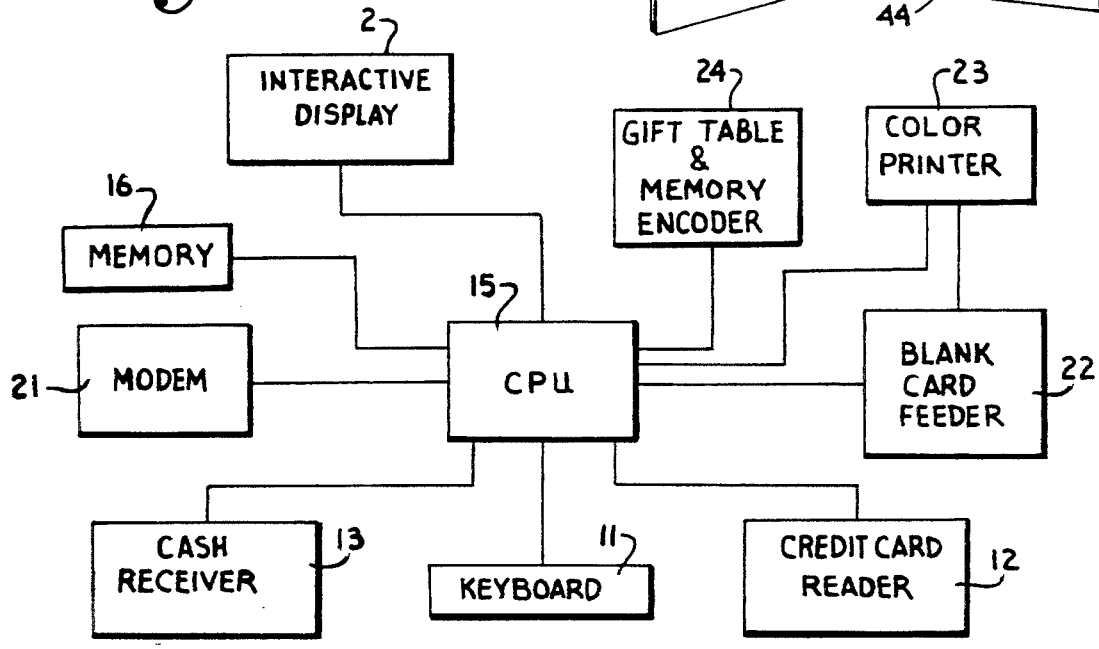

APPARATUS AND METHOD FOR ELECTRONICALLY DISPENSING PERSONALIZED GREETING CARDS AND GIFTS

BACKGROUND OF THE INVENTION

1. Field of the Invention

The present invention relates to a greeting card dispensing apparatus and method which gives a customer the capability to simultaneously design a personalized greeting card and include with it an associated gift. The gifts can include such items as a one or more chances in a telephone game contest, such as the SPELLIT game and the ADDITUP game marketed by the inventor, a limited amount of toll free calling via a 1-800 access number, or a gift certificate, etc.

2. Description of the Related Art

The greeting card business in the United States has evolved into a $5+ billion per year industry. Most greeting cards are still produced by manufacturing concerns as generic cards marketed through retail stores. However, a growing number of greeting cards are produced by specialized vending machines or kiosks which permit the customer to, at least partially, personalize the cards. The personalization available at these vending kiosks can run all the way from merely typesetting the names of sender and receiver to writing verses, selecting and/or modifying pictures, colors, sizes, etc. Hallmark Cards, Inc. of Kansas City, Mo., plans to have upwards of 1900 such kiosks in operation by 1993 under the "Personalize it!" logo, while American Greetings Corp. has a number of operating kiosks under the "CreataCard" logo. The CreataCard kiosks allow great personalizing flexibility since they actually use a plotter pen to write personalized messages and draw any of a number of selected pictures, and Hallmark is test marketing a similar, more versatile kiosk as well. Some industry sources estimate the personalized greeting card business will grow to be a $200+ million dollar industry within five years.

It is no accident that most retail sales outlets for traditional greeting cards are also gift shops as well. It is customary to give a gift on many occasions along with a greeting card, e.g. birthdays, weddings, graduations, etc. Thus, particularly with today's hectic life style, it is more convenient to purchase the gift at the same time and in the same store as the greeting card, or vice versa. By contrast, with the increasing sophistication of the personalized card kiosks, they are now being placed in stand-alone locations in shopping malls, grocery stores, and even airports, etc., where it may not be convenient or even possible to simultaneously purchase a gift as well.

It would be desirable with such personalized greeting card kiosks for the customer to be able to simultaneously purchase a gift along with the personalized card. Such gifts must be capable of being electronically vended by the same kiosk, including, preferably the same card printer. Furthermore, it would be desirable if the gifts themselves, or a receipt evidencing the gifts, could be printed on the personalized card itself.

SUMMARY OF THE INVENTION

The present invention is an automated vending apparatus for simultaneously dispensing personalized greeting cards and electronically vendable gifts. A stand-alone housing incorporates a video monitor, an input alphanumeric keyboard, a credit card reader, and/or cash receiving equipment. A CPU within the housing controls each of these devices, along with a blank card stock feeder, a color printer, a credit verification modem, and a gift table memory and encoder. The gift table memory and encoder can be programmed to encode gifts as chances in a telephone skill game, such as SPELLIT, described in the inventors's U.S. Pat. No. 5,133,560, for example, or ADDITUP, a similar mathematics telephone skill game. Alternatively, the gifts can be, for example, toll free calling time on a major long distance carrier to permit the recipient to call the sender. Other gift possibilities include wagers on the recipient's favorite sports team (such as in Nevada where sports wagering is legal), gift certificates to department stores, etc., or even money in the form of money orders. Virtually any gift which can be evidenced by an electronically generated personalized print-out can be generated and combined with, or printed directly on, a personalized card from the kiosk.

Objects and Advantages of the Invention

The principle objects and advantages of the invention include: to provide an improved electronically controlled apparatus for generating personalized greeting cards and gifts; to provide such an apparatus in which the greeting cards can be created from a number of selected pictures and text, with additional text added by the customer; to provide such an apparatus in which an electronically generated gift can be purchased with the personalized card; to provide such an apparatus in which a CPU is connected to an alphanumeric keyboard and video display which permits the customer to view a representation of the personalized card prior to final printing; to provide such an apparatus in which a gift table memory and encoder is also connected to the CPU and the printer; to provide such an apparatus in which purchases can be made by cash or credit card; to provide such a method in which a personalized greeting card can be combined with an electronically generated gift in a single operation; and to provide such an apparatus and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an electronic apparatus for dispensing personalized greeting cards and gifts, in accordance with the present invention.

FIG. 2 is a schematic block diagram of the electronic apparatus.

FIG. 3 is a perspective view of a combination personalized greeting card and gift generated by the apparatus of FIG. 1.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the numeral 1 generally refers to an apparatus for dispensing personalized greeting cards and gifts. A video display section 2 may include a pair of displays 3 and 4, with the display 3 including a transparent interactive overlay which permits a customer to directly select displayed items with a stylus 5 or by means of a touch screen. A fixed alphanumeric keyboard 11 is used for customer input of alphanumeric and other information. A credit card or debit card reader module 12 and a cash receiver 13 provide alternate modes for customer payment. Finished cards and gifts are delivered via a dispensing tray 14.

Referring to FIG. 2, a block schematic diagram of the apparatus 1 is illustrated. A programmable integrated CPU 15, including ROM and RAM memory 16, is connected to the keyboard 11, the cash receiver and totalizer 13, and the credit card reader 12. The CPU 15 is also connected to the interactive display panel 2 and to a modem 21. The modem 21 is used to dial a preprogrammed credit card verification facility to confirm credit availability for a customer who inserts a credit card in the reader 12 and inputs an associated personal identification number or PIN via the keyboard 11.

A blank card feeder 22 is also connected to the CPU 15, and the feeder 22 stores and feeds card blanks to a color printer 23. A gift table memory and encoder 24 is connected to the CPU 15 as well.

FIG. 3 illustrates a combination greeting card/gift article 31 vended from the apparatus 1. The card 31 includes a typical front cover 32, which can be personalized with a variety of verses and other text 33 accessed via the interactive display 3 via the CPU 15 and the memory 16. The preprogrammed text can be interspersed with personal data input from the keyboard 11, such as, for example, the sender's and receiver's names 34, birthdates, hair color, etc. In a similar manner, images can be selected from a variety of stored digitized images, which can be categorized in a menu driven system displayed on the displays 3 and 4. The entire selection and personalization of cards 31 can be accomplished as taught, for example, in U.S. Pat. No. 5,036,472 to Buckley et al., which is hereby incorporated herein by reference.

Once the card 31 has been selected and personalized, a gift menu can be called up on the displays 3 and 4. The gift menu can read as follows:

SELECT A GIFT

PLEASE SELECT ONE OF THE FOLLOWING:
1. SPELLIT GAME PLAY
2. ADDITUP GAME PLAY
3. STORE GIFT CERTIFICATE
4. TOLL FREE RETURN CALL
5. LOTTERY TICKET

Once a particular one of the gift possibilities has been selected via the keyboard 11 or the interactive display 3, a submenu will appear giving additional directions to the customer. For example, should the customer select Category 4 for a toll free return call, the next screen can read as follows:

TOLL FREE RETURN CALL

1. INPUT TWO DIGIT STATE OF CALL ORIGIN
2. INPUT TWO DIGIT STATE OF CALL RECEIPT
3. INPUT TIME OF CALL IN MINUTES
4. INPUT CALLING WINDOW, I.E. WK-WEEKEND, WD-WEEKDAY OR EVEVENING

Once the above listed entries are made, the CPU 15 will access the gift table memory 24 to determine from a stored telephone rate schedule the charge for such a call. The customer would then be given a price and an opportunity to confirm the transaction, as follows:

THE PRICE FOR THIS CALL IS $12.15. PLEASE CONFIRM THAT THIS AMOUNT IS TO BE CHARGED TO YOUR CREDIT CARD #BY PRESSING THE ENTER KEY.

Once the customer has confirmed the transaction, the personalized card 31 is printed with and instruction message 41 directing the recipient to call a toll free number between certain hours on the last page 42 of the card 31, along with a PIN access number at 43. The PIN number 43 may be covered by an opaque, pealable gum substance 44 or scratch off substance so that the sender or recipient will know if the card 31 has been tampered with.

A similar procedure along with similar dedicated menu prompts will be provided to a customer selecting any of the other gift categories. For example, for the store gift certificate, a number of participating national merchants can be listed, with the customer selecting a particular store and then selecting a certificate dollar amount from a number of preprogrammed dollar amounts. A store logo and certificate information can then be printed on the last page 42 of the card 31, as well as a UPC code or other identifying data (not shown) related to the price to be paid for the card and gift, inventory control, etc., particularly in the event a store clerk is to be involved. Similar menu and customer selection procedures are used for the telephone skill game chances such as SPELLIT and ADDITUP.

The gift calculator and encoder 24 can be comprised of a stand-alone microprocessor and memory which is compatible with the CPU 15. Alternatively, the gift table memory and encoding functions can be programmed into the CPU 15 and associated memory 16.

It is to be understood that while certain forms of the present invention have been illustrated and described herein, it is not to be limited to the specific forms or arrangement of parts described and shown.

What is claimed and desired to be secured by Letters Patent is as follows:

1. A method of vending a combination personalized greeting card and electronically generated gift and of redeeming said gift comprising the steps of:
    (a) presenting a menu of alphanumeric and/or graphic information from which a customer can select data to be printed on said card;
    (b) prompting the customer to select said card data and/or add personal information via a data input means;
    (c) presenting a menu of prepaid long distance telephone access accounts and account values from which a customer can select a particular prepaid telephone access account at a selected value via said input means;

(d) prompting the customer to select said telephone access accounts and values via said data input means;

(e) printing both said selected card data and personal information and information concerning said selected telephone access account including a predetermined telephone number for accessing said prepaid long distance account and account authorizing data;

(f) forwarding the printed card to a gift recipient;

(g) redeeming said gift by dialling said predetermined telephone number to access said prepaid telephone account; and (h) entering said authorizing data to validate said recipient as entitled to use said prepaid telephone account.

2. A combination greeting card and gift produced and redeemed by the method of claim 1.

3. A method as set forth in claim 1 wherein said authorizing data includes a PIN number.

* * * * *